US00RE35842E

United States Patent [19]

Ehlert

[11] E Patent Number: Re. 35,842

[45] Reissued Date of Patent: Jul. 14, 1998

[54] LUBRICATING SYSTEM

[75] Inventor: Charles W. Ehlert, Katy, Tex.

[73] Assignee: Lubrication Systems Company of Texas, Inc., Houston, Tex.

[21] Appl. No.: 643,477

[22] Filed: May 6, 1996

Related U.S. Patent Documents

Reissue of:

[64] Patent No.: 5,318,152
Issued: Jun. 7, 1994
Appl. No.: 10,887
Filed: Jan. 29, 1993

[51] Int. Cl.[6] ..... F01M 1/00

[52] U.S. Cl. ..... 184/6.26; 184/104.1; 184/6.4

[58] Field of Search ..... 184/6.26, 6.21, 184/6.22, 6.23, 6.24, 104.1, 31, 6.1, 6.4, 55.1

[56] References Cited

U.S. PATENT DOCUMENTS

| | | | |
|---|---|---|---|
| 2,895,883 | 7/1959 | Hobson | 184/6.24 |
| 3,490,560 | 1/1970 | Hierta | 184/6.26 |
| 3,543,879 | 12/1970 | Munn | 184/6.26 |
| 3,665,684 | 5/1972 | White | 184/6.26 |
| 3,871,484 | 3/1975 | Thomas | 184/6.26 |
| 4,601,840 | 7/1986 | Zehler et al. | 184/6.26 |
| 5,125,480 | 6/1992 | Gregory et al. | 184/6.26 |

FOREIGN PATENT DOCUMENTS

| | | | |
|---|---|---|---|
| 532050 | 10/1956 | Canada | 184/6.26 |
| 1100689 | 9/1955 | France | 184/6.26 |
| 2571825 | 4/1985 | France | 184/6.26 |

*Primary Examiner*—Thomas E. Denion
*Attorney, Agent, or Firm*—Bill B. Berryhill

[57] ABSTRACT

An improved lubricating system for continuous closed lubrication of bearings including: an oil mist generator; a distribution assembly for distributing oil mist from the oil mist generator to the bearings; a collection device for collecting excess oil and oil mist from the bearings and a return assembly through which excess oil and/*or* oil mist [are] *may be* returned from the collection device to an oil mist collection/supply vessel for reuse.

31 Claims, 4 Drawing Sheets

LUBRICATING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to lubrication systems for lubricating the bearings of bearing equipment items. More specifically, the present invention pertains to lubrication systems in which an oil mist is formed by combining air and oil and then distributed to the bearings to be lubricated.

2. Description of the Prior Art

For many years bearings have been lubricated by various means. In early lubrication systems, bearings were lubricated by "one shot" application of grease and/or oil to a grease or oil fitting with a grease gun or oil can. Although attempts were made to apply the grease or oil at needed periodic frequencies, it is obvious that at times too much oil and/or grease was used, and at other times, not enough oil and/or grease was provided for lubrication. For this reason, lubrication systems which apply the lubricant and at timed, periodic intervals or on a continuous basis, were developed.

U. S. Pat. No. 4,445,168 discloses a microcomputer controlled lubrication system which monitors and controls lubrication. In this system, individual "shots" of lubricant are periodically delivered based on either a time cycle or a machine stroke cycle. Other systems, such as the one disclosed in U.S. Pat. No. 4,527,661 utilize what is referred to in the industry as an "air - oil lubrication system" in which separate oil and air streams are brought to and combined by a mixing device, i.e. an atomizer, at a point immediately adjacent to the bearing being lubricated. However, such systems require two sets of piping (one for oil and one for air) and individual mixing devices at each point of lubrication.

In more recent years, oil mist lubrication systems have been developed to provide continuous, effective lubrication to anti-friction bearings of rotating equipment such as centrifugal pumps, electric motors, steam turbines, gear boxes, blowers, and fans. An oil mist lubrication system typically comprises an oil mist generator in which a compressed air stream in turbulent flow is combined with a liquid lubricant to create a fine mist of oil particles suspended in an air stream. These oil particles are typically one to five microns in diameter. The oil mist is transported through a piping system and delivered into the bearing housings of rotating equipment. The oil mist continuously lubricates the bearings of the equipment and maintains a slight positive pressure in the bearing housing to reduce contamination from outside sources.

When oil mist is generated, the oil is atomized into very fine particles so that the oil mist will remain stable and can be transferred relatively long distances with minimum wetting out on the walls of the pipe in which it is being conveyed. These fine particles, referred to as "dry mist", must be converted into larger particles, referred to as "wet mist", in order to wet out on the metal surfaces of the equipment bearings being lubricated. This is accomplished by passing the dry mist through a specially designed restriction orifice known as a "reclassifier". The reclassifier induces turbulence in the stream to combine small particles into larger ones before the mist (wet mist) enters the equipment bearing housing. These reclassifiers serve the additional purpose of metering the amount of lubricant to each bearing to avoid over or under lubrication. Selection of the correct reclassifier for each application point in the system is based upon an understanding of the exact bearing configuration for each piece of equipment to be lubricated.

An especially advanced oil mist lubricating system is disclosed in U.S. Pat. No. 5,125,480. It includes an air supply, the inlet of which is connected to a source of pressurized air; an oil supply; an oil mist generator connected to the air supply and the oil supply and by which air and oil therefrom are combined in an oil mist for distribution; and microprocessor control means for controlling and monitoring the operating conditions of the system. Such a system provides for continuous lubrication of the bearings of rotating equipment with greatly improved monitoring and control characteristics. Operating variables of the system are maintained within desired limits and oil consumption and oil mist density are accurately controlled, reducing oil consumption and environmental pollution.

Even though recent oil mist systems, such as the one disclosed in U.S. Pat. No. 5,125,480, offer much more effective and efficient lubrication, such systems, unfairly in many cases, are criticized for environmental pollution. It is true that some of the oil mist particles, particularly the smallest ones, do not wet out on the metal surface of the equipment being lubricated. They may pass through bearing housings and vent to the atmosphere. In addition, although much less excess oil may accumulate near the lubricated bearings in an oil mist lubrication system, a certain amount of excess oil will accumulate. In the past, collection vessels have been provided, whether in oil mist systems or in the older conventional lubricating systems, to collect the excess oil for periodic recovery and/or reuse. Many times, however, the excess oil is collected in a open container susceptible to contamination by rain water or other substances. In many obsolete systems, such oil was simply drained to sewers.

SUMMARY OF THE PRESENT INVENTION

The present invention pertains to an improved oil mist lubrication system for continuous lubrication of a plurality of bearings. The system may include an oil mist generator by which air and oil are combined to form a dry oil mist. A distribution assembly is connected to the oil mist generator to distribute the oil mist to the bearings to be lubricated. In a preferred embodiment, the distribution assembly includes a supply header through which the dry oil mist is distributed and at least one reclassifier for converting the dry oil mist to a wet oil mist just prior to application to the bearings to be lubricated. The system also provides collection means, which in a preferred embodiment, comprises an enclosed container to which drain lines from the bearings are connected and into which excess oil and oil mist from the bearings may flow and accumulate. The collection means may also comprise a pump, the inlet of which communicates with oil in the enclosed container and the outlet of which is connected to a return assembly by which excess oil and oil mist are returned for recycling and reuse. In a preferred embodiment, the return assembly includes a return header through which excess oil and oil mist are returned to an oil supply vessel. The oil supply vessel may be provided with a demisting filter by which excess oil mist is separated into oil and oil-free air, the oil accumulating in the oil supply vessel and the oil-free air being vented therefrom. Oil collected in the oil supply vessel may then be rerouted to the oil mist generator for recycling through the system.

The improved lubrication system of the present invention, like the advanced system of U.S. Pat. No. 5,125,480, provides continuous lubrication of bearings with superior monitoring and control characteristics. In addition, the improved oil mist lubrication system of the present invention, provides a superior system in which the lubricant is distributed, collected and recycled in a completely enclosed loop to eliminate the environmental concerns associated with potentially escaping or stray oil mist and oil accumulation of prior systems.

There are many beneficial characteristics of the closed loop oil mist system of the present invention. First and foremost, machine reliability and performance are improved by reducing bearing failures, excluding contaminants from bearing housings and eliminating over or under lubrication. Equipment bearings run cooler and energy is conserved. Most importantly, the improved oil mist lubrication system of the present invention meets much higher environmental standards. Emissions are reduced because oil mist vents to atmosphere are eliminated. No oil or oil mist is directed to equipment base plates or sewers resulting in safer, cleaner operations. Oil consumption and used oil disposal costs are reduced because oil and oil mist are continuously collected, filtered and reused. Potential spills are minimized since open containers are no longer needed for routine filling and draining of equipment. Hydrocarbon load on effluent treatment facilities is virtually eliminated. Oil container disposal and handling problems and costs are avoided because there is no need for oil drums or totes.

The superior characteristics of the oil mist lubrication system of the present invention are provided with environmental investment cost justification. The centralized, fully automated system means greater efficiency. This system is effective in harsh environments, extreme heat, cold, humidity and dust. It improves safety by eliminating hazardous manual lubrication tasks. The system can be easily retrofitted to existing, in place equipment. The system justifies the use of superior performing synthetic lubricants which were not economical and cost justifiable with other systems. In short, the improved oil mist lubrication of the present invention provides high performance lubricating characteristics while satisfying environmental and cost concerns of the users. Many other objects and advantages of the invention will be apparent from reading the description which follows in conjunction with the accompanying drawings.

DESCRIPTION OF A PREFERRED EMBODIMENT

Figure 1:
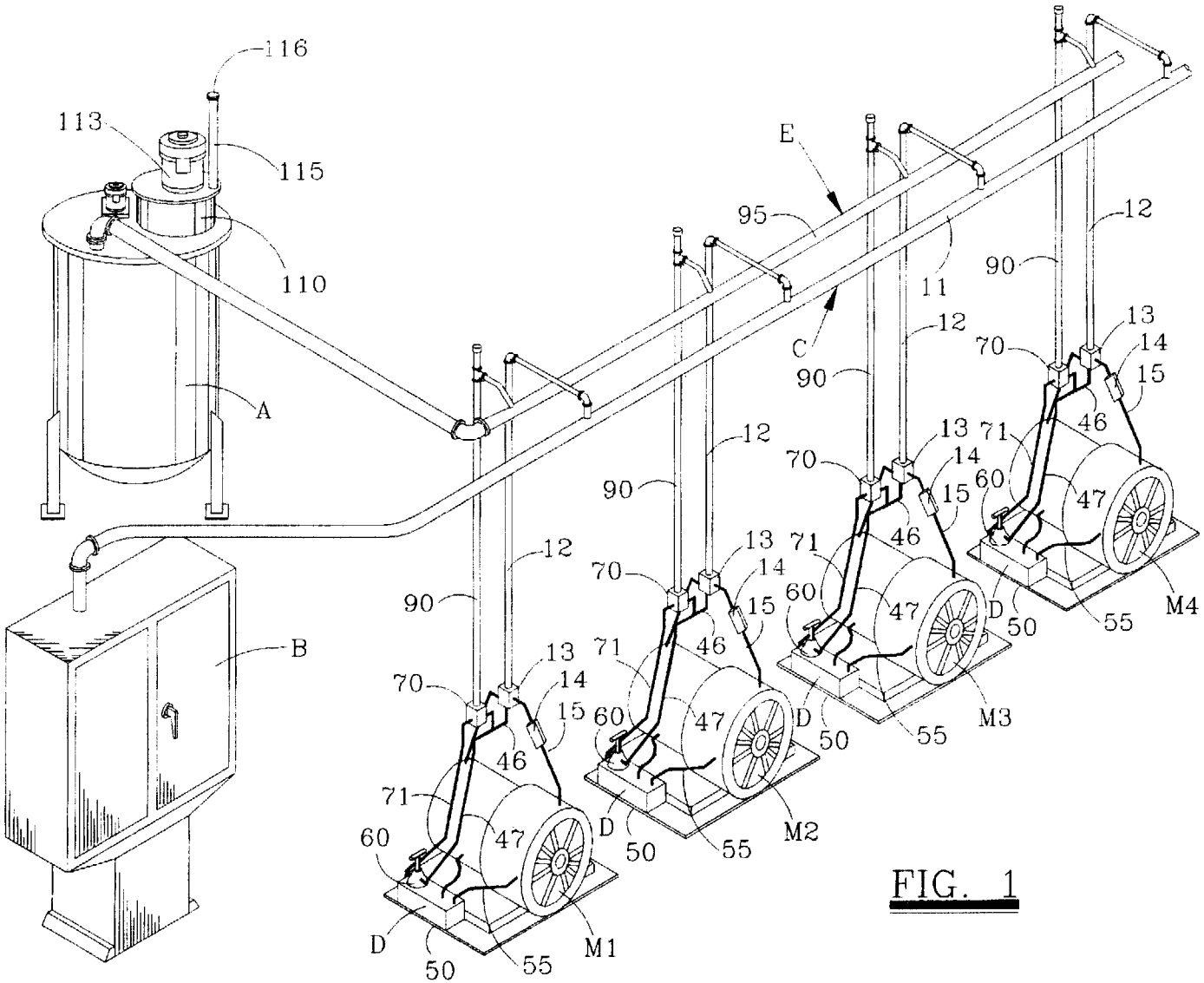
FIG. 1 is pictorial illustration of an oil mist lubrication system, according to a preferred embodiment of the invention.

Referring first to FIG. 1, there is shown an improved oil mist lubricating system for continuous closed loop lubrication of a plurality of bearings of one or more bearing equipped items. For illustration purposes only, the system shown is being used to lubricate the bearings of electric motors M1, M2, M3 and M4. Of course, the system could be used to lubricate many other numbers and types of bearing equipped items such as centrifugal pumps, steam turbines, gear boxes, blowers, fans, etc.

The oil mist lubrication system of the present invention may comprise an oil collection/supply vessel A; an oil mist generator B; a distribution assembly, generally designated C; collection means D; and a return assembly, generally designated E. The other piping and equipment illustrated in the background of FIG. 1 simply represents in a general way any number of items and facilities with which the oil mist lubrication system of the present invention could be used.

The oil mist generation means, generally represented at B in FIG. 1, could be of a number of designs. An extremely effective and efficient oil mist generator is described in the aforementioned U.S. Pat. No. 5,125,480. For present purposes, it is sufficient to understand that the oil generation means B is connected to a source of compressed air and a source of oil, e.g. the oil collection/supply vessel A. The oil and air are properly heated, pressurized and flow regulated and brought together in a vortex or other type of mist head, creating an oil mist in which the oil is atomized into very fine particles which can be conveyed over long distances with a minimum wetting out on the walls of pipe through which it is being conveyed. These fine particles, are generally referred to as a "dry mist" in which the oil particles are typically one tenth to five microns in diameter.

Figure 2:
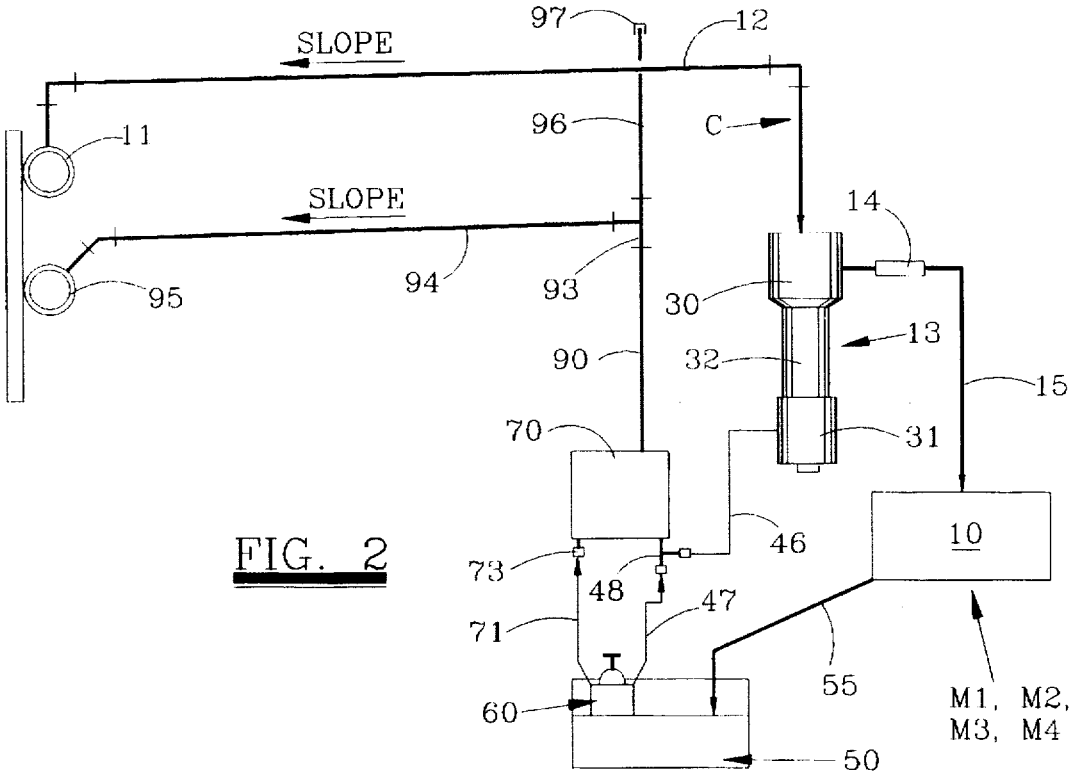
FIG. 2 is a schematic representation of a portion of an oil mist lubrication system, similar to the one shown in FIG. 1, according to a preferred embodiment of the invention.

Referring now also to FIG. 2, the distribution assembly C transmits the dry mist from the mist generator B to individual points of lubrication such as the closed bearing housings of the electric motor M1, M2, M3 and M4. Such a bearing housing is designated at 10 in FIG. 2. The distribution assembly C may include a supply header 11 connected to the oil mist generator B and branching off of which are a number of mist supply conduits 12 for supplying oil mist to the individual points of lubrication such as the bearing housing 10. The supply header 11 and the generally horizontal portions of the mist supply lines 12 preferably slope slightly downwardly in a direction toward the mist supply generator B.

The distribution assembly C may also include an oil mist manifold 13 having an inlet connected to the mist supply conduit 12 and one or more outlets of which are connected to reclassifiers 14 which are in turn connected through oil mist conduits 15 to the bearing housing 10. As previously explained, the purpose of reclassifiers 14 is to convert the small particles of oil in the dry mist supplied through the mist manifold 13 to larger particles of oil (wet mist) for application to the bearing housing 10. The particular size and type of reclassifier 14 is selected for the type of bearing to which the oil mist is supplied.

Figure 3:
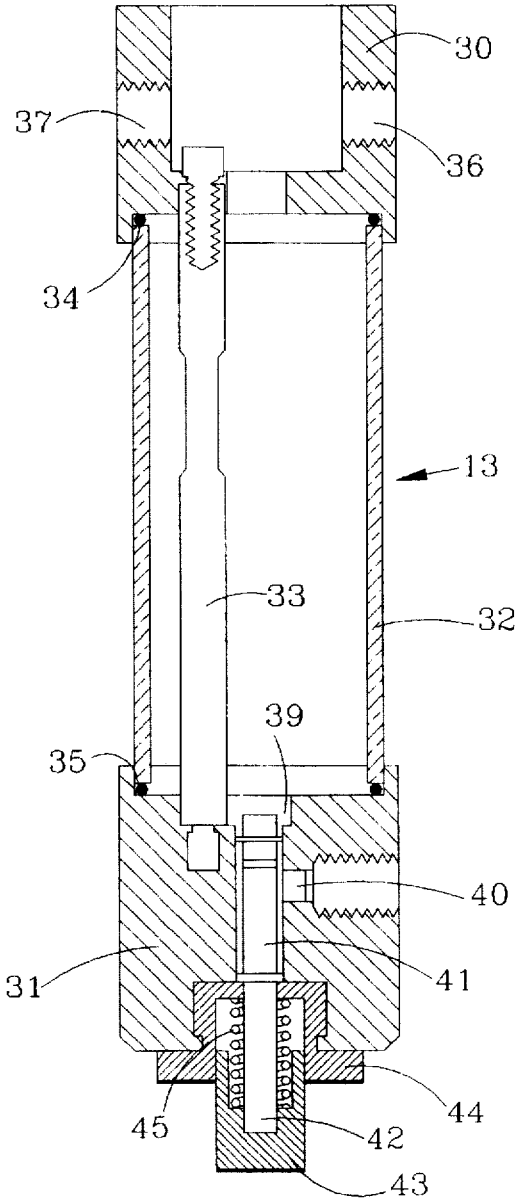
FIG. 3 is an elevation view, in section, of an oil mist manifold, suitable for use in the oil mist lubrication system of FIGS. 1 and 2, according to a preferred embodiment thereof.

Referring now to FIG. 3, a preferred embodiment of the mist manifold 13 will be described in greater detail. The oil mist manifold 13 comprises an upper body portion 30 and a lower valve body portion 31 in between which is a transparent sight tube 32. The body portions 30,31 and the sight tube 32 are held in an assembly by one or more tie rods 33, only one of which is shown in FIG. 3. O ring seals 34 and 35 seal the assembly. The upper body portion 30 is provided with one or more outlets 36,37 for connection with one or more reclassifiers such as the reclassifier 14 of FIG. 2. The valve body 31 is provided with a centrally located inlet port 39 and an outlet port 40 which is normally closed by the a valve spool 41. The valve spool 41 has a valve stem 42 and associated cap 43 biased against a valve nut 44 by a spring 45 which biases the valve spool 41 to the closed position shown in FIG. 3. By pressing upwardly on the valve stem cap 43, the spring 45 will be compressed and the valve spool 41 raised to a position permitting fluid flow around the valve spool 41 and out of the valve outlet 40.

For present purposes, it is sufficient to understand that as dry oil mist is brought into the oil mist manifold 13 through the oil mist supply line 12 (see FIG. 2), the oil mist is then distributed to one or more reclassifiers, such as reclassifier 14 of FIG. 2, through the outlet ports 36,37 etc. Should oil particles coalesce in the supply conduits and the oil mist manifold 13, the oil will accumulate in the transparent sight tube 32 and the level thereof will be visible through the sight tube 32. Should the oil in the oil mist manifold 13 reach a significant level, it may be discharged through the valve body outlet 40 by opening the valve 31. Any accumulated oil and oil mist will therefore be discharged to oil collection components of the invention such as an oil collection container 50 schematically depicted in FIG. 2 and shown in more detail in FIG. 5. Thus the outlet port 40 of the valve 31 is connected through conduits 46 and 47 to the collection container 50 by virtue of a T-type connection 48. In addition, when valve 31 is opened and after oil is discharged from the sight tube 32, the flow of oil mist into and through the sight tube 32 is visible. Thus, the flow of mist into the manifold can be verified without venting to the atmosphere. The oil mist which exits through the valve 31 will also be routed through a return manifold 70, a component of the return assembly, to be more fully described hereafter.

Figure 5:
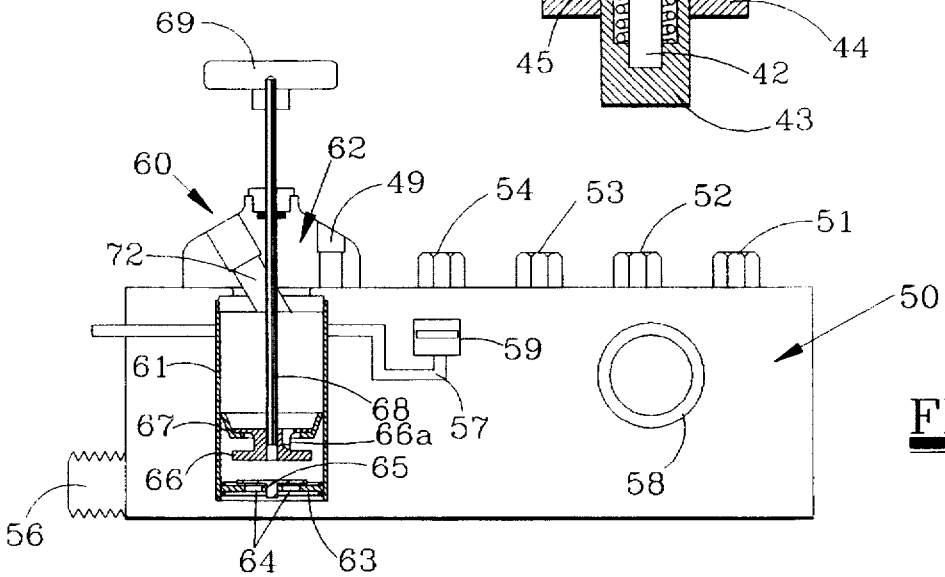
FIG. 5 is an elevation view, partially in section, of oil collection container and associated pump suitable for use with the oil mist lubrication system of FIGS. 1 and 2, according to a preferred embodiment of the invention.

Referring now also to FIG. 5, the collection container 50 is essentially a closed tank provided with one or more inlets 51,52,53,54 through which oil or oil mist may flow into the container 50. For example, one of these inlets may be connected to a drain line 55 from the bearing housing 10 of FIG. 2 for collecting excess oil and/or oil mist from the bearing housing 10. The container 50 may also be provided with a plugged drain outlet 56 through which the container 50 may be drained if necessary. It will also be noted that the collection container 50 is provided with a P-trap or P-tube 57 one end of which opens externally of the tank 50. The P-tube 57 serves at least three purposes. First, the P-trap helps maintain the collection tank 50 at near atmospheric pressure so that the necessary pressure differential is maintained to induce flow of oil mist through the system. Secondly, oil trapped in the P-tube 57 prevents oil mist from escaping from the container into the atmosphere. Thirdly, the p-tube protects against the shutting off of oil mist to equipment bearings, should the collection container 50 be filled with oil to an excessive level. If this were to occur, the pressure differential necessary for oil mist flow would be jeopardized, shutting off or reducing the flow of oil mist necessary for lubricating the bearings. The P-tube 57 prevents this from happening by providing a path for overflow of oil should the oil reach the highest level of the P-tube. The end of the P-tube 57 in the collection tank 50 is connected to a float valve 59. The float valve 59 closes when the hand operated pump 60 is used. Without the float valve, oil would be ejected from the P-tube due to the differential pressure created by the action of the pump 60. Incidently, a transparent window or "bullseye" 58 may be provided to give a visual indication of the level of oil in the container 50.

Attached to the collection container 50 is a hand operated pump 60. The pump 60 includes a pump tube or barrel 61 which extends downwardly through a hole provided in the upper part of the collection tank 50 and a pump head 62 by which the pump 60 is sealingly attached to the container 50. The lower end of the pump barrel 61 is provided with a valve plate 63 having valve ports 64 therein and a foot valve or poppet 65 which allows oil in the container 50 to flow into the barrel 61 but prevents reverse flow thereof. A piston plunger 66 and associated piston cup 67 is mounted in the pump barrel 61 for reciprocal motion therein on a pump rod 68. A handle 69 is attached to the pump rod 68. There is an outlet port 72 through the pump head 62. This port may be connected, via a conduit 71, to the manifold 70 through a check valve connection 73. Another port 59 may be connected to conduit 47. (See FIG. 2) As the container 50 fills with oil, some of the oil flows into the pump barrel 61 through the valve plate ports 64 and rises in the pump barrel 61 around the pump plunger 67 and through a bypass 66a through the pump plunger 66. When the oil reaches a level at which it should be removed from the oil collection container 50, an operator manually grasps the valve handle 69 pulling upwardly on the pump rod 68 plunger 66 and plunger cup 67 forcing fluids in the pump barrel 61 through the outlet port 72, the line 71 and check valve 73, through the return manifold 70 and additional components of the return assembly E generally depicted in FIGS. 1 and 2 and more fully described hereafter. When conditions so require, the pump 60 described herein could also be powered pneumatically or electrically rather than manually.

At this point, a return manifold 70, according to a preferred embodiment of the invention, will be described with reference to FIG. 4. The return manifold 70 comprises a body 75 having first and second inlet ports 76 and 77 and an outlet port 78. If desired, another port 79 with a plug 80 or sight window or "bulls eye" may also be provided. The first inlet port 76 may be engaged by a connector body 81 which is provided with side ports 82,83 and a central flow passage 84. One of the side ports 82,83 may provide a means of connecting the conduit 46 from the outlet of the mist manifold valve 31 (See FIG. 2) In fact, the connector body 81 may form part of the T-type connection designated by the reference numeral 48 in FIG. 2. Of course, this T-connection 48 could be made at some distance from the return manifold 70 in which case the port 76 would simply be engaged by a conduit which would extend to some other type of t connector 48.

Connected to the outlet port 78 of the manifold body 75 is a vertical tubular conduit or oil riser 90. Concentrically disposed in the vertical oil riser 90 is a tubular mist vent riser 91, the lower end of which is sealingly engaged with the inlet port 76. This provides an annular flow passage 92 between the internal walls of the oil riser 90 and the external walls of the mist riser 91. Referring also to FIG. 2, the return oil riser 90 is connected to a tee fitting 93 and a slightly sloping downwardly generally horizontal conduit 94 which is connected to the return header 95. The riser 90 has an extended portion 96 which is connected to one branch of the tee 93 for extension, e.g. eighteen inches, above the conduit 94. The upper end of extension 96 is closed by a cap 97. The oil mist riser 91, shown in FIG. 4, rises upwardly through the return oil riser 90, the tee 93 and the riser extension 96 terminating at a point slightly below the cap 97. The oil mist vent 91 is opened at its upper end.

Referring again to FIG. 4, the return manifold 70 may be provided with a cavity 85 in which is placed a ball cage 86 and ball 87 which engage and are held in place by a check valve body 88. The check valve body 88 carries a ball seat 89 which when engaged by the ball 87 prevents reverse flow of oil through the manifold 70. The check valve body 88, ball cage 86 and ball 87, jointly referred to as a check valve, is depicted by the reference numeral 73 in FIG. 2. In fact, the check valve 73 could be located at some point remote from the return manifold 70. In any event, the inlet of the check valve 73 (check valve body 88 in FIG. 4) would be connected by the conduit 71 to the discharge of the pump 60. (See FIG. 2)

Figure 4:
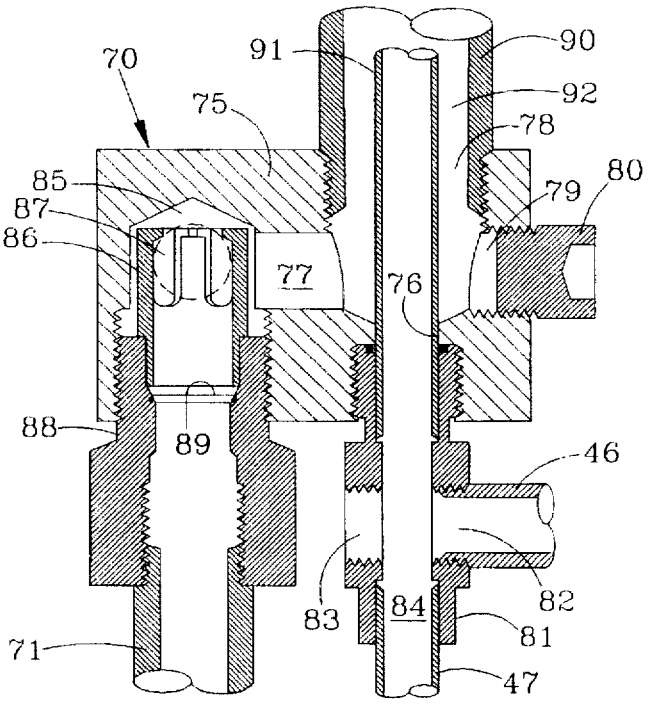
FIG. 4 is an elevation view, in section, of a return manifold, suitable for use in an oil mist lubricating system such as the ones shown in FIGS. 1 and 2, according to a preferred embodiment thereof.

It is important at this point to understand the function of the return manifold 70 shown in FIG. 4. When oil and oil mist are discharged from the valve 31 of the mist manifold 13, the oil and oil mist enters the vent connector body 81 through one of the ports 82,83. Oil and oil mist then flow through the conduit 47 into the oil collection container 50. However, most of the oil mist entering the vent connector body 81 rises through the oil mist vent tube 91, exiting the upper end thereof (at a point above the return line 94), and then flows through the annular space surrounding the upper end of the oil mist vent tube 91 within the riser extension 96. The oil mist then continues to flow through the upper sections of the return lines 94 and return header 95 toward the oil collection/supply vessel A generally depicted in FIG. 1. In addition to the oil mist discharged from the mist manifold 13, oil mist flowing through the bearing housing 10 also passes through the return manifold 70 as follows. Mist from the bearing housing 10 flows through the bearing housing drain tubing 55 into the oil collection tank 50. Some of this mist settles and coalesces in the tank 50, the non-coalesced oil mist flows through vent port 59 in the pump housing 62 and through conduit 47 which is also affixed to the return manifold 70 at the vent connector body 81. From here the oil mist from the bearing housing 10 continuously flows through the vent tube 91 and to the upper section of the return lines 94 and return headers 95 toward the oil collection/supply vessel A. Oil being collected in the oil container 50 is pumped out of the container by the pump 60 through the conduit 71 and the check valve 73 (or check valve body 88) lifting the check ball 87 off the seat 89 (see FIG. 4) and allowing the oil to flow through the inlet port 77 and out the outlet port 78 in the annular space 92 between the oil riser 90 and the oil mist riser 91. The oil is pumped upwardly through the riser 90 exiting through the horizontal branch of tee 93 into the return lines 94 and return header 95 for eventual return to the oil collection/supply vessel generally depicted at A in FIG. 1.

Figure 6:
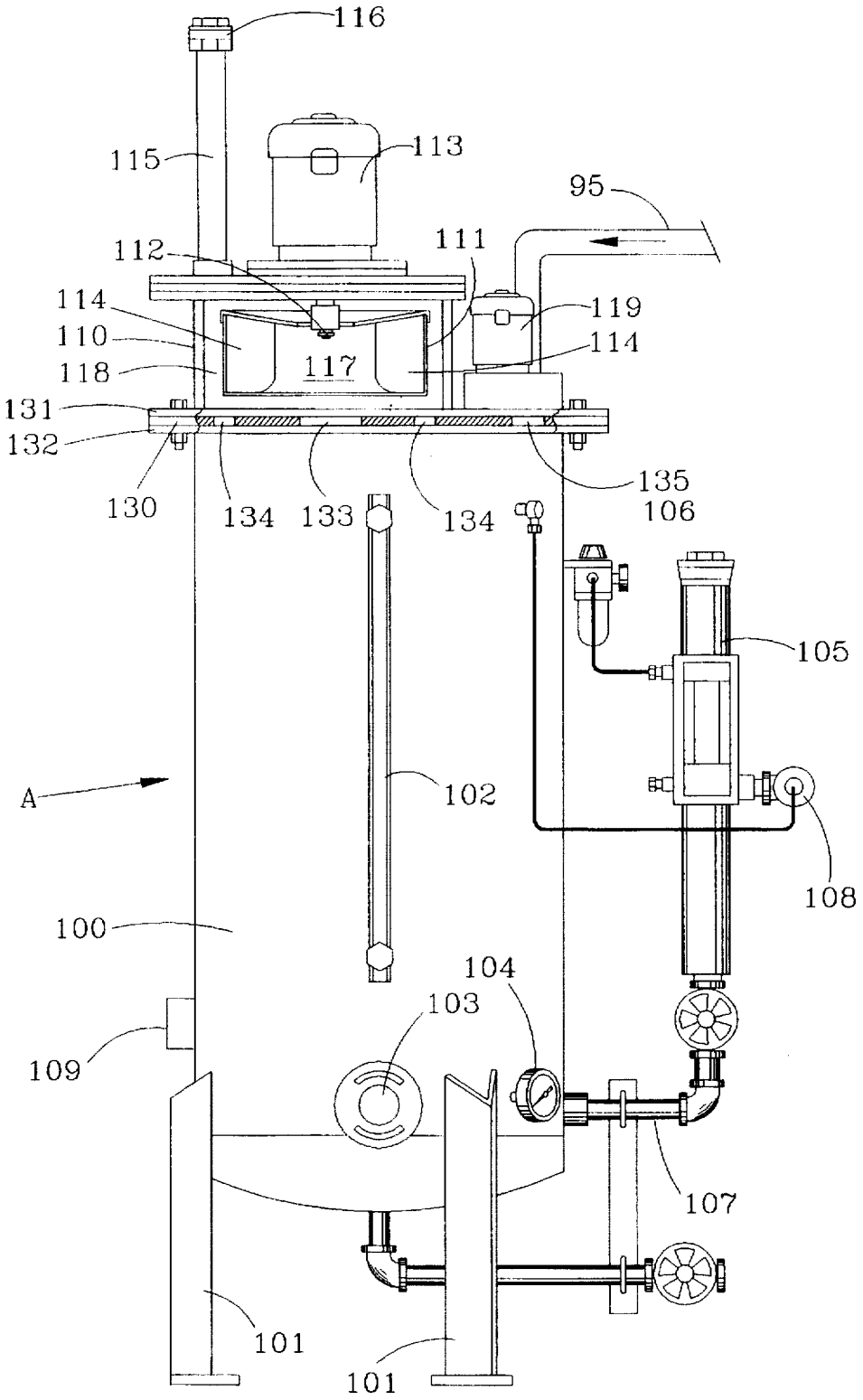
FIG. 6 is an elevation view, partially in section, showing an oil collection/supply vessel which may be used with the oil mist lubrication system of FIGS. 1 and 2.

The return manifold 70, return riser 90, the oil mist vent return 91 concentrically disposed therein, and the return lines 94 and return headers 95 are all components of the return assembly E. The oil and oil mist returning through the return assembly E, specifically that collected in return header 95, flow to the oil collection/supply vessel generally depicted at A in FIG. 1 and shown in greater detail in FIG. 6.

The oil collection/supply vessel A includes a tank 100 supported on legs 101 and into which oil and oil mist are returned by the return assembly E through return header 95. The vessel is provided with a number of control elements such as an oil level gauge 102, an oil heater 103, temperature gauge 104, oil level alarm 109, etc. An air operated pump 105 supplied with air through a combination filter, regulator and oiler assembly 106 pumps oil from the tank 100 via pump inlet piping 107 through a supply line 108 back to the oil mist generator, generally depicted at B in FIG. 1.

The upper portion of the oil collection/supply vessel A is provided with a demisting filter generally housed in a cylindrical section 110 separated from the tank 100 by dividing plate 130. The demisting filter includes a rotatable drum 111 connected to the shaft 112 of a motor 113. The drum 111 is similar to the cage of a squirrel cage blower. As it is rotated by the motor 113 a negative pressure is created in the central area 117 of the drum 111. This draws any oil mist in the tank 100 into the central area 117 of the drum via a center hole 133 in plate 130. A positive pressure is created in the area 118 on the exterior of the drum so that the oil mist does not enter this area. The rotating demisting filter does not create a negative pressure in the demisting vessel. This would create a negative pressure in the return mist system piping (System E) leading to negative pressure in the bearing housings. Such a vacuum would defeat one of the benefits of oil mist which is to prevent contaminants from entering bearing housings through maintenance of positive pressure. The flow of oil mist from the bearing housings is due solely to the flow of mist from the oil mist generator into and through the bearing housings. Discharge from vent 116 is determined by the volume of oil mist produced by the mist generator.

A filter media is provided in the area 114 surrounding the central drum area 117. Centrifugal force causes the oil mist entering the central area 117 to flow through the filter media 114, coalescing the oil particles therein and causing the oil particles to collect on the outer areas of the drum 111 and the inner walls of the cylindrical section 110, falling by gravity into the tank 100 via holes 134. The oil free air separates therefrom and then flows through the vent stack 115 and vent 116 back into the atmosphere. There is no static filter between the bearing housings (M1, M2, M3, M4) and the air discharge 116. A static filter tends to foul, and its performance is affected by temperature and oil viscosity. Fouling of such a filter would restrict air flow and soon render the system inoperable. In the current invention, because of the air passage from the vessel 100 via holes 134 connected to area 113 which leads to the vent 116, failure of the mist filter to rotate will not lead to blockage. Oil mist would then by-pass the filter media Thus, the improved lubricating system of the present invention provides a system which continuously lubricates bearings with oil mist in a closed loop system in which excess oil and oil mist from lubrication [are] *may be* collected and returned for recycling without contaminating the environment with oil or oil mist or lowering the pressure in the bearing housings of the equipment being lubricated. Vents to atmosphere (except for oil-free air) and drains to sewers are eliminated. Spent oil mist and coalesced oil [are] *may be* captured, routed to and collected by an oil collection/supply vessel. Any oil mist returning to this vessel is passed through a non-fouling, fail-safe, demisting filter, which separates and retains the oil and vents oil-free air to the atmosphere. The system is probably the most advanced lubrication system available.

A preferred embodiment of the invention has been described herein with some variations discussed. However, many variations of the invention can be made without departing from the spirit of the invention. *For example, in a less automated embodiment, the spent oil mist may be captured and returned to an oil collection/supply vessel through the return assembly D while coalesced oil is simply collected at the collection container 50 from which it may be drained through outlet 56 for reuse or disposal. In this simplified version, the pump 60 could be eliminated.* Accordingly, it is intended that the scope of the invention be limited only by the claims which follow.

I claim:

1. An improved lubricating system for continuous lubrication of a plurality of bearings of one or more bearing equipped items, said system comprising:

oil mist generation means by which air and oil are combined to form [an] *a dry* oil mist;

a distribution assembly connected to said oil mist generation means and by which *dry* oil mist therefrom is *remotely transmitted and* distributed to *one or more reclassifiers, said reclassifiers converting said dry oil mist to wet oil mist for distribution to* said bearings;

collection means connected to said bearing equipped items for collecting oil and excess oil mist from said bearings;

a return assembly connected to said collection means and by which oil and excess oil mist are returned for reuse; and characterized in that oil and oil mist in said distribution assembly, said collection means and said return assembly are completely enclosed and isolated from the surrounding environment.

2. An improved lubricating system as set forth in claim 1 including an oil collection/supply vessel connected to said return assembly and into which said oil and excess oil mist, uncontaminated by said surrounding environment, are returned for reuse.

3. An improved lubricating system as set forth in claim 2 in which said oil collection/supply vessel is connected to said oil mist generator means to supply oil for said combination of said air and oil therein to form said *dry* oil mist.

4. An improved lubricating system as set forth in claim 2 including demisting filter means connected to said oil collection/supply vessel and by which excess oil mist from said return assembly is separated into oil and oil-free air, said oil for accumulating in said oil collection/supply vessel and said oil-free air for venting therefrom.

5. An improved lubricating system as set forth in claim 4 in which said demisting filter means include a motor driven [from] *drum* which, by centrifugal force, forces oil mist through filter media to coalesce and separate oil from said excess oil mist for gravity flow into said supply tank, said oil-free air being vented through vent means to the atmosphere.

6. An improved lubrication system as set forth in claim 1 in which said distribution assembly includes a supply header connected to said oil mist generation means for distributing *said dry* oil mist therefrom [and at least] *to said* one *or more* [reclassifier for receiving oil mist from said supply header and converting] *reclassifiers which convert* fine particles of oil in said *dry* oil mist to larger particles of oil for *said* distribution *as said wet oil mist* to one or more of said bearings, said bearings being enclosed under positive pressure and isolated from the atmosphere.

7. An improved lubricating system as set forth in claim 6 including at least one oil mist manifold having an inlet connected to said supply header and one or more outlets, one of which is connected to said one *or more* reclassifiers.

8. An improved lubricating system as set forth in claim 7 in which said oil mist manifold is provided with a normally closed valve the outlet of which is connected to said collection means, opening of said valve allowing any oil accumulated in said manifold to drain to said collection means.

9. An improved lubricating system as set forth in claim 8 in which said oil mist manifold is provided with a transparent sight tube through which any oil accumulating in said manifold is viewed and, when said oil is drained from said sight tube, oil mist flow is viewed.

10. An improved lubricating system as set forth in claim 1 in which said collection means comprises an enclosed container to which drain lines from one or more of said bearings are connected and into which excess oil and oil mist from said bearings may flow and accumulate.

11. An improved lubricating system as set forth in claim 10 in which said collection means comprises a pump, the inlet of which communicates with oil in said enclosed container and the outlet of which is connected to said return assembly operation of said pump transferring oil from said enclosed container through said return assembly for said reuse thereof.

12. An improved lubricating system as set forth in claim 1 in which said return assembly comprises at least one return manifold an outlet of which is connected to a return header through which said oil and excess oil mist are returned for reuse, said return manifold having an inlet for receiving oil from said collection means and an inlet for receiving excess oil mist from said collection means.

13. An improved lubricating system for continuous closed lubrication of bearings of one or more bearing equipped items, said system comprising:

oil mist generation means by which oil and air are combined to form [an] *a dry* oil mist;

a distribution assembly including a supply header connected to said oil mist generation means and at least one reclassifier connected to said supply header for receiving and converting fine particles of oil i said *dry* oil mist to larger particles of oil *in a wet oil mist* for application to one or more of said bearings;

collection means including an enclosed container to which drain lines from said one or more of said bearings are connected to allow excess oil and oil mist from said bearings to flow and accumulate;

a return assembly including a return header connected to said collection container and through which excess oil and oil mist therefrom flow;

an oil collection/supply vessel connected to said return header for receiving excess oil and oil mist from said system for reuse, said oil collection/supply vessel being connected to said oil mist generation means to supply oil for said combination of oil and air into said *dry* oil mist; and characterized in that the oil and oil mist in said distribution assembly, said collection means and said return assembly are completely isolated from the surrounding environment.

14. An improved lubricating system as set forth in claim 13 in which said oil collection/supply vessel is provided with demisting filter means by which any excess oil mist from said return header may be separated into oil and oil-free air, said oil for accumulation in said supply vessel and said oil-free air for venting therefrom.

15. An improved lubricating system as set forth in claim 13 in which said distribution assembly comprises at least one oil mist manifold having an inlet connected to said supply header and one or more outlets, one of which is connected to said [reclassifier] *reclassifiers, one or more* said oil mist manifold having means for detecting accumulation of oil and flow of oil mist therein and a normally closed valve opening of which allows oil accumulated in said oil mist manifold to drain through a discharge conduit into said enclosed collection container.

16. An improved lubricating system as set forth in claim 15 in which said collection container is provided with pump means by which said excess oil accumulated therein may be pumped through said return header to said oil collection/supply vessel.

17. An improved lubricating system as set forth in claim 16 in which said return assembly includes a return manifold the outlet of which is connected to said return header, one inlet which is connected to said pump means for receiving oil pumped from said collection container and one inlet which is connected to the outlet of said oil mist manifold valve so that on opening of said valve at least some oil mist [will] bypass said collection container and flow through said return manifold into said return header.

*18. An improved lubricating system for continuous lubrication of a plurality of bearings of one or more bearing equipped items, said system comprising:*

*oil mist generation means by which air and oil are combined to form a dry oil mist;*

*a distribution assembly connected to said oil mist generation means and by which dry oil mist therefrom is remotely transmitted and distributed to one or more reclassifiers, said reclassifiers converting said dry oil mist to wet oil mist for distribution to said bearings;*

*collection means connected to said bearing equipped items for collecting oil and excess oil mist from said bearings;*

*a return assembly connected to said collection means and by which excess oil mist is returned for reuse; and*

*characterized in that oil and oil mist in said distribution assembly, said collection means and said return assembly are completely enclosed and isolated from the surrounding environment.*

*19. An improved lubricating system as set forth in claim 18 including an oil collection/supply vessel connected to said return assembly and into which said excess oil mist, uncontaminated by said surrounding environment, is returned for reuse.*

*20. An improved lubricating system as set forth in claim 19 in which said oil collection/supply vessel is connected to said oil mist generator means to supply oil for said combination of said air and oil therein to form said dry oil mist.*

*21. An improved lubricating system as set forth in claim 19 including demisting filter means connected to said oil collection/supply vessel and by which excess oil mist from said return assembly is separated into oil and oil-free air, said oil for accumulating in said oil collection/supply vessel and said oil-free air for venting therefrom.*

*22. An improved lubricating system as set forth in claim 21 in which said demisting filter means include a motor driven drum which, by centrifugal force, forces oil mist through filter media to coalesce and separate oil from said excess oil mist for gravity flow into said supply tank, said oil-free air being vented through vent means to the atmosphere.*

*23. An improved lubrication system as set forth in claim 18 in which said distribution assembly includes a supply header connected to said oil mist generation means for distributing said dry oil mist therefrom to said one or more reclassifiers which convert fine particles of oil in said dry oil mist to larger particles of oil for distribution as said wet oil mist to one or more of said bearings, said bearings being enclosed under positive pressure and isolated from the atmosphere.*

*24. An improved lubricating system as set forth in claim 23 including at least one oil mist manifold having an inlet connected to said supply header and one or more outlets, one of which is connected to said one or more reclassifiers.*

*25. An improved lubricating system as set forth in claim 24 in which said oil mist manifold is provided with a normally closed valve the outlet of which is connected to said collection means, opening of said valve allowing any oil accumulated in said manifold to drain to said collection means.*

*26. An improved lubricating system as set forth in claim 25 in which said oil mist manifold is provided with a transparent sight tube through which any oil accumulating in said manifold is viewed and, when said oil is drained from said sight tube, oil mist flow is viewed.*

*27. An improved lubricating system as set forth in claim 18 in which said collection means comprises an enclosed container to which drain lines from one or more of said bearings are connected and into which excess oil and oil mist from said bearings may flow and accumulate.*

*28. An improved lubricating system as set forth in claim 18 in which said return assembly comprises at least one return manifold an outlet of which is connected to a return header through which said excess oil mist is returned for reuse, said return manifold having an inlet for receiving excess oil mist from said collection means.*

*29. An improved lubricating system for continuous closed lubrication of bearings of one or more bearing equipped items, said system comprising:*

*oil mist generation means by which oil and air may be combined to form a dry oil mist;*

*a distribution assembly including a supply header connected to said oil mist generation means and at least one reclassifier connected to said supply header for receiving and converting fine particles of oil in said dry oil mist to larger particles of oil in a wet oil mist for application to one or more of said bearings;*

*collection means including an enclosed container to which drain lines from said one or more of said bearings are connected to allow excess oil and oil mist from said bearings to flow and accumulate;*

*a return assembly including a return header connected to said collection container and through which excess oil mist therefrom flows; and*

*an oil collection/supply vessel connected to said return header for receiving excess oil mist from said system for reuse, said oil collection/supply vessel being connected to said oil mist generation means to supply oil for said combination of oil and air into said dry oil mist; and*

*characterized in that the oil and oil mist in said distribution assembly, said collection means and said return assembly are completely isolated from the surrounding environment.*

*30. An improved lubricating system as set forth in claim 29 in which said oil collection/supply vessel is provided with demisting filter means by which any excess oil mist from said return header may be separated into oil and oil-free air, said oil for accumulation in said supply vessel and said oil-free air for venting therefrom.*

*31. An improved lubricating system as set forth in claim 29 in which said distribution assembly comprises at least one oil mist manifold having an inlet connected to said supply header and one or more outlets, one of which is connected to said one or more reclassifiers, said oil mist manifold having means for detecting accumulation of oil and flow of oil mist therein and a normally closed valve opening of which allows oil accumulated in said oil mist manifold to drain through a discharge conduit into said enclosed collection container.*

* * * * *